Oct. 14, 1958

H. VERMETTE 2,856,101

OIL PUMPING MECHANISM

Filed July 5, 1956

INVENTOR.
HOWARD VERMETTE
BY
Harry H. Hitzeman
ATTORNEY.

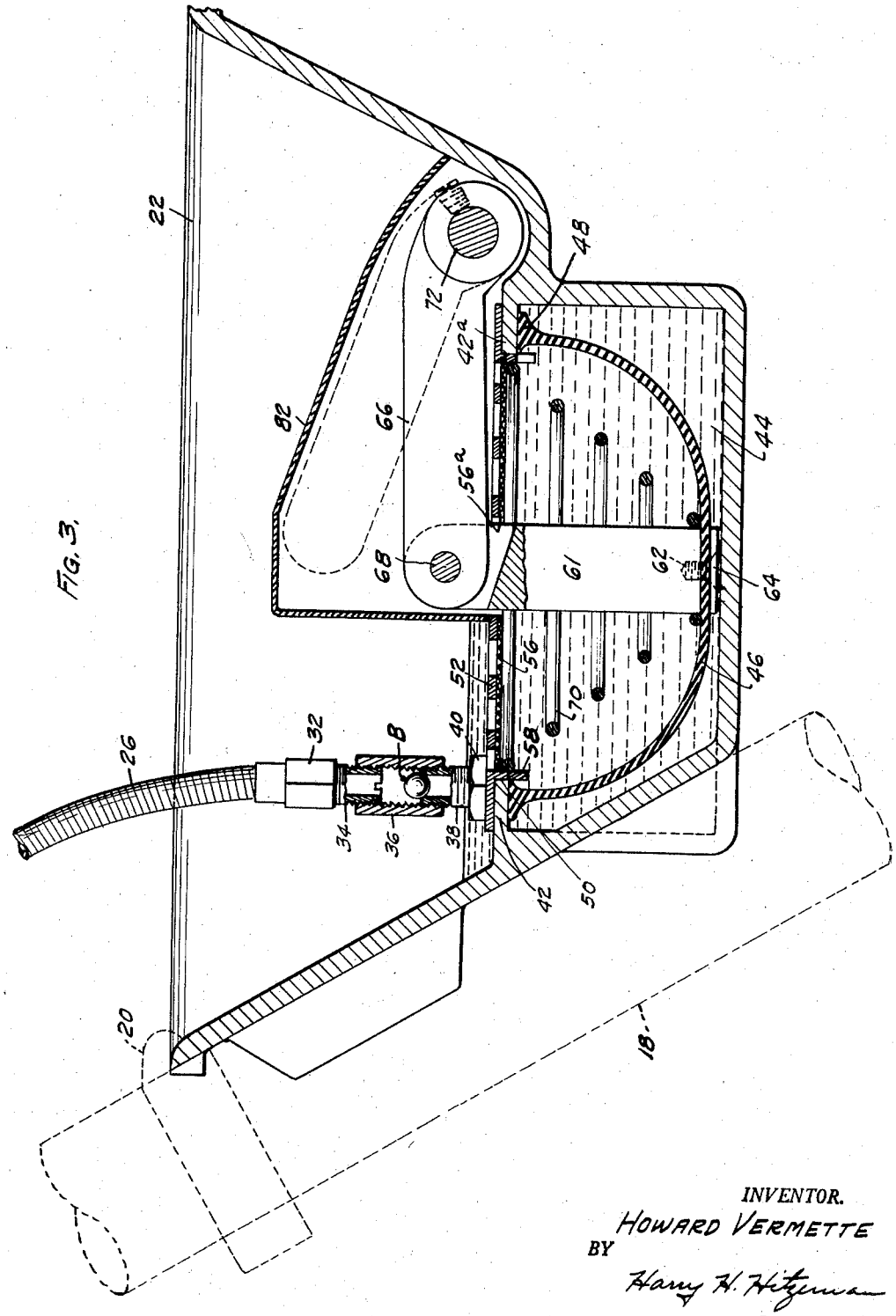

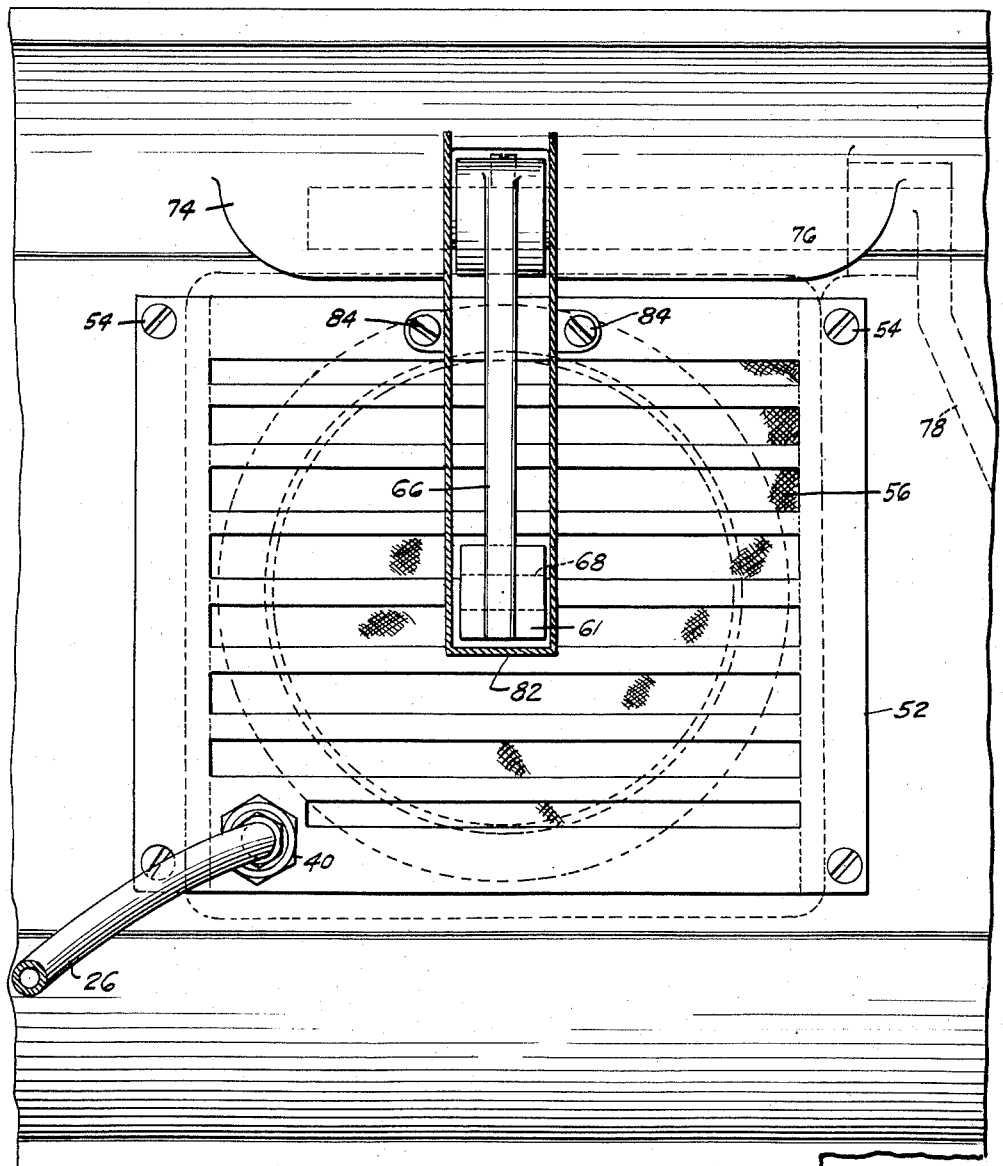

Oct. 14, 1958
H. VERMETTE
2,856,101
OIL PUMPING MECHANISM
Filed July 5, 1956
4 Sheets-Sheet 4
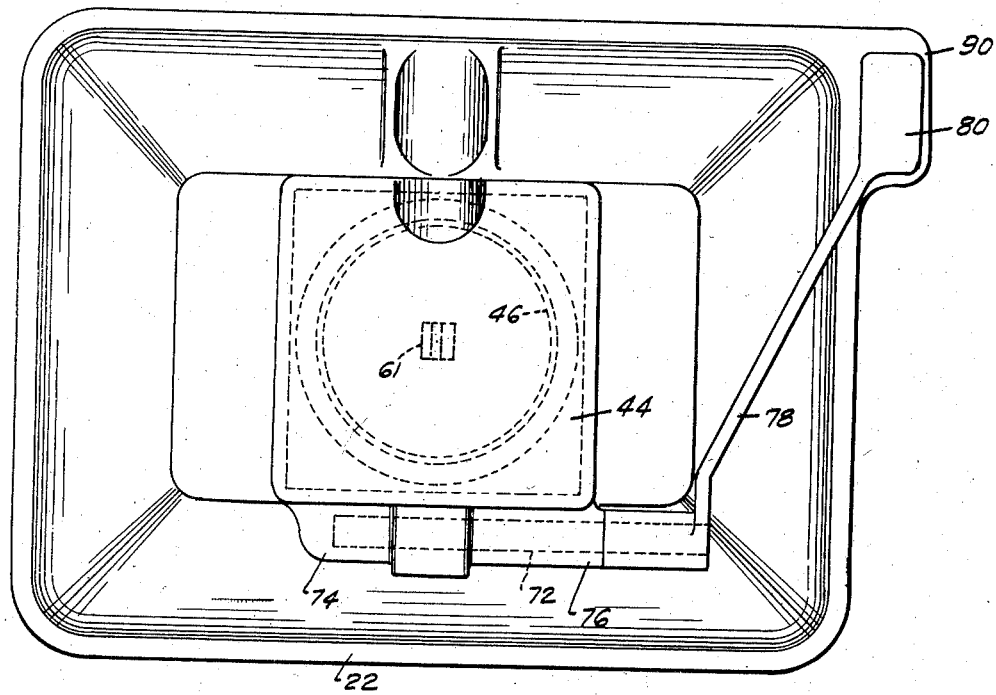
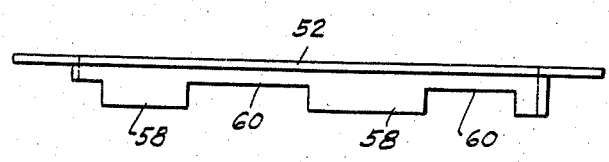
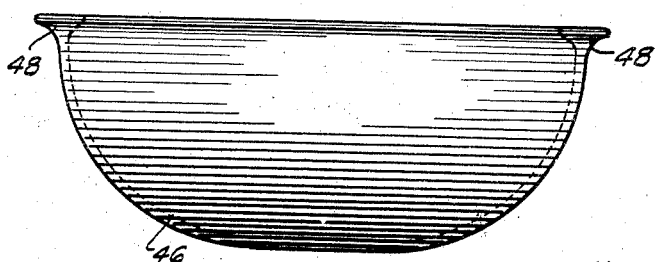
INVENTOR.
HOWARD VERMETTE
BY
Harry H. Hitzeman
ATTORNEY.

2,856,101

OIL PUMPING MECHANISM

Howard Vermette, Hammond, Ind.

Application July 5, 1956, Serial No. 596,024

9 Claims. (Cl. 222—189)

My invention relates to improvements in oil pumping mechanism.

My invention relates more particularly to oil pumping mechanism for use with a power drive of the type used for threading or cutting pipe, tubes or similar structures.

As is well known in the art, when portable pipe threading machines, such as shown in my United States Patent No. 2,673,742 are used by plumbers, pipe fitters or other artisans at the location where work is to be done, hand cutting, threading and reaming tools are used on the pipe, tube or rod which is driven for the purpose of operating on the same. Machines such as described usually support a shallow pan positioned below the work location so that chips and metal shavings resulting from work on the pipe or other object may drop into the same. Since metal cutting or working creates considerable heat at the work dies, an oil can is kept handy and the workman must frequently squirt oil on the work in progress.

The principal object of my invention is to provide an improved oil pumping mechanism associated with the shavings or waste collection pan for pumping oil through a flexible conduit to a nozzle directed at the work dies of a tool operating on a pipe being rotated by a power drive mechanism.

A further object of the invention is to provide a mechanism of the type described which includes an oil reservoir in the bottom of the waste pan and semi-automatic oil pumping means associated therewith for pumping oil under pressure through a nozzle remote therefrom.

A further object of the invention is to provide a unique pump mechanism including a rubber suction cup capable of manual compression to charge the same for automatic discharge of a measured quantity of oil under pressure through a discharge nozzle.

A further object of the invention is to provide a construction of oil reservoir and suction cup pump mechanism so arranged that upon each manual compression of the suction cup additional oil is replenished to the reservoir from the waste pan.

Other objects and advantages will be more apparent from the following description wherein reference is had to the accompanying drawings, upon which:

Fig. 3 is a cross-sectional view taken through the waste pan and pump mechanism, generally on line 3—3 of Fig. 1; with the pipe working machine forward leg and supporting clamp shown in dotted lines thereon;

Fig. 4 is a fragmentary plan view of the waste pan and associated parts, with parts broken into section to more clearly show other parts;

Fig. 5 is a bottom plan view of the waste pan and associated mechanism;

Fig. 6 is a side elevational view of the screen grid that is employed; and

Fig. 7 is a side elevational view of the suction cup which is employed as a pumping means.

Figures 1, 2:
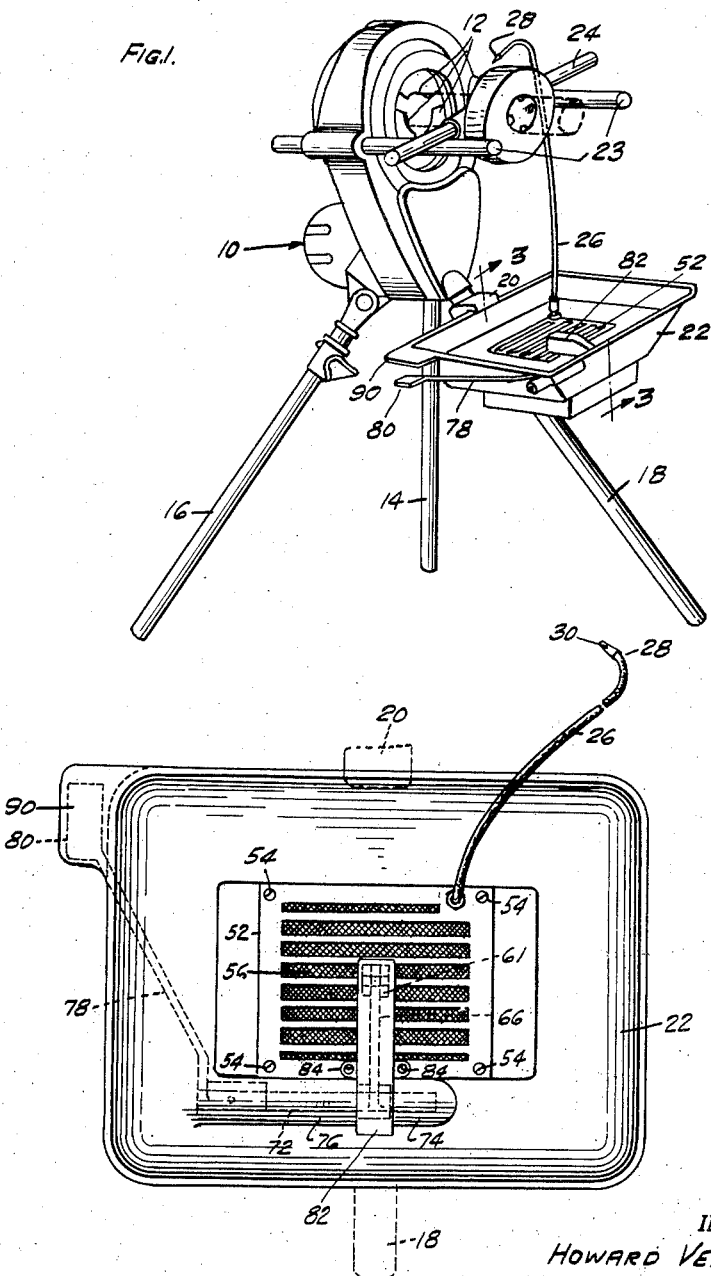
Fig. 1 is a front perspective view of a pipe working machine showing a pipe threader supported on the forwardly extending rods at the front of the machine and a waste pan and oil pump mechanism supported upon the forward leg of the machine.
Fig. 2 is a plan view of the combined waste pan and oil pumping mechanism showing the flexible oil conduit extending upwardly therefrom.

In the embodiment of the invention which I have chosen to illustrate the same, I have shown a pipe working machine 10 of the type shown in the aforementioned U. S. Patent and which may include a power unit having jaw members 12 for gripping a pipe or other object to be worked upon. The jaws are associated with the power drive of the machine so that in operation the pipe or other object that is being held is rotated. The machine may also include a support means comprising the leg members 14, 16 and 18, the front leg member 18 being provided with a clamp 20 for supporting a waste pan 22 below the work location of the machine.

The pipe working machine is provided with the forwardly extending rod members 23 to support a cutting, threading or reaming tool 24 thereon, these being the usual tools that are used for working upon a pipe that is being rotated in the pipe working machine.

The waste pan 22 which I provide has a flexible oil conduit 26 extending upwardly therefrom, the end of the same being provided with a nozzle 28 having an opening 30 therein to direct a stream of oil under pressure against the dies and the work during operation.

The oil conduit 26 is connected at its lower end to a nut member 32 which receives one end of a threaded nipple 34, the other end entering a coupling 36. A second nipple 38 is connected between the coupling 36 and a fastening nut 40 mounted in the cover 42 of the oil reservoir 44 positioned in the lower side of the pan 22. A ball valve B is mounted between the ends of the nipples 34 and 38 to provide a check valve to prevent return of oil from the conduit 26.

I position a vacuum cup 46 in the reservoir 44, the peripheral edge 48 of the same being adapted to underlie an overhanging ledge 42a of the top of the reservoir, the ledge having a cylindrical opening 50 therein. This opening is adapted to be closed by a flat screen grid 52, the same being fastened at its four corners by suitable screw members 54. A straining screen 56 is mounted on the under surface of the grid 52 and the grid is also provided with a downwardly turned peripheral ledge portion 58 that has spaced elongated cut-outs 60 therein.

The vacuum cup 46 which forms the pump mechanism may have a post 61 fastened centrally therein by means of a screw 62 and a washer 64, the post having a slot in its upper end to receive one end of the pump lever 66. The pump lever is pivotally connected to the post by means of a pin member 68. A helical coiled spring 70 may be mounted inside the suction cup positioned between the peripheral flange of the grid and about the post 61. The pump lever 66 may be screw-threadedly mounted on a shaft 72 that is supported in suitable bearings 74 and 76 cast integral with the pan 22, the shaft extending outwardly through the bearing 76 and being pinned to a lever 78 that extends outwardly from the shaft 72 and is provided with a pad portion 80 at its end.

The screen 56 has a suitable opening 56a centrally thereof to permit operation of the suction cup post 61, and in order to prevent chips or shavings from falling through the same I have provided a shield or cover 82 over the pump lever 66, the same being fastened to the grid 52 by means of a pair of screws 84.

The pan 22, as shown, may be generally rectangular in shape and comparatively shallow above the reservoir 44, the end of the same adjacent the hand lever 78 and pad 80 having a flattened extension 90 against which the pad 80 may be drawn to effect a stop limit for the same.

The oil pumping mechanism which I have described operates as follows: Assuming that a coolant such as oil has been placed in the pan 22 and reservoir 44 to the level shown in Fig. 3, and the handle 78 is raised so that the pad 80 reaches the ledge 90 of the waste pan 22, the pump lever 66 pulls up on post 61 and raises the suction cup 46 against the compression of the coiled spring 70. As the bottom of the suction pump is pulled up, a partial vacuum is created in the reservoir 44 and this causes oil to be sucked into the reservoir over the top edge 48 of the cup. Then when the handle 78 is released, the spring 70 will move the cup to its original shape. The oil below the cup bears against the lip 48 making a seal at this point and oil will be forced out of the reservoir through check valve B and conduit 26. Therefore oil which is located in the pan both inside the suction pump and in the pan above the same, will always flow past the upper edge 48 of the cup into the reservoir 44 by reason of the vacuum created as the cup is being compressed, thus keeping the reservoir 44 filled with oil.

As upward pull on the lever 78 is released, the suction cup 46, aided by the spring 70, will tend to conform to its original shape, and in moving downwardly towards the same, pushes oil under pressure out through the check valve B through the conduit 26 and out through the opening 30 in the nozzle 28, the conduit being so adjusted that the stream of oil which is directed outwardly will flow against the work location.

The normal time for the pumping action (the straightening out of the cup 46 to its normal shape) is approximately one minute, and pumping will thus cease until the lever 78 is again raised, which is done by the workman whenever he desires to apply oil to the work being done. Due to the grid and screen that is provided over the opening through the reservoir, metal chips and shavings are prevented from flowing with the oil into the reservoir during a compressing operation.

From the above and foregoing description it can be seen that I have provided a semi-automatic oil pumping unit for use with the waste pans of pipe working machines or other machine tools so arranged that oil may be directed when desired on the work being done, the only manual operation being the raising of the lever 78 whenever a pumping action is desired.

While in this disclosure the pump unit has been shown and described as being attached to the waste pan of a pipe working machine, it will of course be understood that the waste pan or reservoir which I employ may be formed as part of or separate from any machine tool that needs a lubricant or coolant, or other uses may be found for a pump mechanism of the type shown, and the present invention which it is desired to protect in this application is the pump unit.

While I have illustrated and described a specific embodiment of the invention, it will be apparent to those skilled in the art that changes and modifications may be made in the exact details shown and I do not not wish to be limited in any particular; rather what I desire to secure and protect by Letters Patent of the United States is:

1. The combination with the waste pan of a pipe working machine of an oil pumping mechanism, said waste pan being rectangular in shape and having a floor, an opening in said floor, an oil reservoir therebelow, a screen and grid over said opening, an upturned suction cup in said reservoir, said cup having a peripheral lip engaging the bottom of said floor around said opening, a medial post connected to said cup, a lever connected to the upper end of said post, a pivot shaft for said lever, said shaft extending out through one side of said pan, a hand lever connected to said shaft and a spiral spring in said suction cup, said cup compressed upwardly in a pumping operation by movement of said hand lever and returned to normal by said spiral spring, and a conduit from said reservoir through which the oil is pumped.

2. The combination with the waste pan of a pipe working machine of an oil pumping mechanism, said waste pan being rectangular in shape and having a floor, an opening in said floor, an oil reservoir therebelow, a screen and grid over said opening, an upturned suction cup in said reservoir, said cup having a peripheral lip engaging the bottom of said floor around said opening, a medial post connected to said cup, a lever connected to the upper end of said post, a pivot shaft for said lever, said shaft extending out through one side of said pan, a hand lever connected to said shaft and a spiral spring in said suction cup, said cup compressed upwardly in a pumping operation by movement of said hand lever and returned to normal by said spiral spring, and a conduit from said reservoir through which the oil is pumped, said conduit having a check valve therein.

3. An oil pumping mechanism including a pan having a bottom wall, a circular opening in said wall and an oil reservoir below said wall, an upwardly turned circular suction cup positioned in said reservoir with its peripheral flange encircling said opening, a screen grid fastened over said opening and having a serrated circular flange extending into said opening and engaging the inner edge of the suction cup flange, an upright post connected to the center of said vacuum cup, a lever connected to the upper end of said post, a shaft mounted in bearings in the wall of said pan, said lever connected thereto, a hand lever fastened to said shaft, and an outlet conduit from said reservoir.

4. An oil pumping mechanism including a pan having a bottom wall, a circular opening in said wall and an oil reservoir below said wall, an upwardly turned circular suction cup positioned in said reservoir with its peripheral flange encircling said opening, a screen grid fastened over said opening and having a serrated circular flange extending into said opening and engaging the inner edge of the suction cup flange, an upright post connected to the center of said vacuum cup, a lever connected to the upper end of said post, a shaft mounted in bearings in the wall of said pan, said lever connected thereto, a hand lever fastened to said shaft, and an outlet conduit from said reservoir, said suction cup compressible when said lever is operated to draw oil into said reservoir over the peripheral flange of said suction cup and discharge the same through said outlet conduit under pressure when said suction cup is expanding to normal shape.

5. The combination with the waste pan of a pipe working machine of an oil pumping mechanism, said pumping mechanism including an oil reservoir below the floor of said waste pan, the floor of said pan having an opening, a screen over said opening, a suction cup in said reservoir, said cup having a peripheral lip surrounding the opening in the floor of said waste pan means for compressing said cup, said means including a post extending upwardly through said screen, a lever connected thereto for compressing said cup, a conduit leading from said reservoir and an ejection nozzle at the end of said conduit.

6. The combination with the waste pan of a pipe working machine of an oil pumping mechanism, said pumping mechanism including an oil reservoir below the floor of said waste pan, the floor of said pan having an opening, a screen over said opening, a suction cup in said reservoir, said cup having a peripheral lip surrounding the opening in the floor of said waste pan, means for compressing said cup, said means including a post extending upwardly through said screen, a lever connected thereto for compressing said cup, a conduit leading from said reservoir and an ejection nozzle at the end of said conduit, said post and operating lever having a cover thereover in said waste pan.

7. A fluid pumping mechanism comprising a fluid reservoir having a circular flange therein, a circular suction cup mounted in said reservoir facing upwardly therein and having a circular lip bearing against said circular flange and means for compressing said cup upwardly to draw fluid into said reservoir past the circular lip of said cup, said reservoir having a valved outlet extending therefrom.

8. A fluid pumping mechanism comprising a reservoir having an intermediate wall, said wall having an opening therethrough, a chamber therebeneath and communicating with said reservoir through said opening, an upturned suction cup in said chamber having a circular lip surrounding said opening, means for compressing said cup upwardly to draw fluid into said chamber over the circular lip of said suction cup and means to assist said cup to return to normal shape after compression to discharge fluid under pressure from said chamber.

9. A fluid pumping mechanism comprising a reservoir having an intermediate wall, said wall having an opening therethrough, a chamber therebeneath and communicating with said reservoir through said opening, an upturned suction cup in said chamber having a circular lip surrounding said opening, means for compressing said cup upwardly to draw fluid into said chamber over the circular lip of said suction cup and means to assist said cup to return to normal shape after compression to discharge fluid under pressure from said chamber, said last named means comprising a spiral spring positioned between the floor of said suction cup and said intermediate wall.

References Cited in the file of this patent

UNITED STATES PATENTS

| | | |
|---|---|---|
| 355,757 | Crothers | Jan. 11, 1887 |
| 1,834,957 | Marlow | Dec. 8, 1931 |
| 2,437,605 | Karge | Mar. 9, 1948 |
| 2,476,545 | Hayward | July 19, 1949 |
| 2,768,550 | Ingwer | Oct. 30, 1956 |